United States Patent [19]

Acquaviva

[11] 3,882,824
[45] May 13, 1975

[54] GROOMING AID FOR HAIRY ANIMALS

[76] Inventor: Gwendolyn Kay Acquaviva, 982 Ledge Rd., Medina, Ohio 44256

[22] Filed: Oct. 16, 1973

[21] Appl. No.: 405,561

[52] U.S. Cl.................................. 119/156; 119/158
[51] Int. Cl............................................. A01k 29/00
[58] Field of Search ....... 119/156, 160, 143, 1, 158; 54/79; 424/71

[56] References Cited
UNITED STATES PATENTS
| | | | |
|---|---|---|---|
| 2,688,311 | 9/1954 | Pierce | 119/156 |
| 2,750,947 | 6/1956 | Gant | 424/71 |
| 2,840,087 | 6/1958 | Hersh | 424/71 |
| 3,392,040 | 7/1968 | Kass | 424/71 X |

OTHER PUBLICATIONS

McGregor, Silicones and Their Uses, 1954, 195.

Primary Examiner—Hugh R. Chamblee
Attorney, Agent, or Firm—Frederick K. Lacher

[57] ABSTRACT

A hair polish composition and process is described for improving the gloss or shine of hair and particularly the coats of hairy animals. The hair polish composition comprises a liquid silicone which can be applied to the coat of the animal and subsequently will dry to the desired superior shiny finish.

5 Claims, No Drawings

GROOMING AID FOR HAIRY ANIMALS

BACKGROUND OF THE INVENTION

This invention relates to a method for improving the appearance of hair, and more particularly, to a method of grooming hairy animals utilizing a liquid silicone which is applied to the hair of the animal.

It is often desirable to improve the appearance of the coat of a hairy animal by providing a superior glossy or shiny finish thereon. It is important that hairy animals, such as horses, dogs, cows, etc., be well groomed when being exhibited either at animal shows or for sale. The appearance of the animal's coat is important in selling an animal since one of the tests of finer breeding is that the animal has a fine coat. Heretofore, the grooming of animals, such as horses, has been time consuming and the result not completely satisfactory.

It also is desirable to improve the appearance of hair contained on other base materials such as articles of wearing apparel. Shiny, dirt resistant finishes are desirable on, for example, fur coats and wigs.

In the past, oils, such as mineral oil, glycerine or other oil-base sprays or solutions which may contain materials such as lanolin, have been utilized to groom hair and the coats of animals. One of the problems of this treatment is that the oily surface does not dry and has a tendency to attract and collect dust which soon destroys the desirable luster of the coat. Moreover, on animals having light colored hair, the dust will gray the lightly colored mane or tail. The problems arising with the use of oils, such as mineral oil and glycerine, are accentuated with larger animals such as horses which tend to perspire when being exercised or shown. When the horse perspires, the oil and dust mixes with the perspiration and will run down the side of the horse removing the oil and thereby the glossy finish. In some instances, this also results in streaking of the horse's coat.

The dust collecting problem of the oil treatments which have been used in the past is so severe that the lustrous finish often lasts less than 10 minutes before enough dust is collected to dull the luster even when the horse is not being exercised. The previously used oils also suffered additional disadvantages such as being water soluble and were easily removed from the coat. Experience also has shown that when oils are used and collect dust, the horse must be completely re-groomed in order to remove the dust. That is, the horse must be washed which not only removes the dust but also the oil. Thus, more oil must be applied to obtain the desired groomed appearance.

SUMMARY OF THE INVENTION

These and other problems relating to the grooming of hair and particularly the coats of hairy animals have been minimized by the process of this invention which comprises applying to the hair a composition containing liquid silicone which, when dried, does not attract dust or dissolve in water and provides the coat of the animal with a superior glossy or shiny appearance. Silicones are particularly effective polishes for the coats of hairy animals and they can be applied to the animal in solution or as a water emulsion. The process of this invention provides a long lasting gloss or shine to the coat of the animal.

DESCRIPTION OF THE PREFERRED EMBODIMENTS

Hairy animals which can be treated in accordance with the present invention include horses, cows, dogs, etc. Wigs, fabrics, and articles of wearing apparel also can be treated. As mentioned above, the method of this invention involves applying a liquid silicone to the hair and thereafter, the silicone treated hair dries to the desired superior polished finish on the hair. The liquid silicone can be applied to the hair neat although it is preferred to apply the silicone in a more diluted form such as in solution or as an emulsion. Solutions of the silicones in solvent grade hydrocarbons, both aliphatic and aromatic, such as petroleum naphthas, toluene, etc., can be prepared for application of the silicone to the coat of the animal. However, these solvents present fire hazards and are toxic thereby requiring special handling and application techniques.

In a preferred embodiment, the silicones are applied to the hair as a water emulsion comprising water and from about 1 to about 40% by weight of the silicone. Evaporation of the water leaves a thin coating around the hairs of the animal which develops a highly desirable luster.

In a preferred embodiment, the silicone utilized in the preparation of the solution or emulsion for application to the hairy animal are polysiloxanes which have the following general structure:

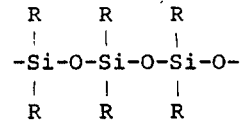

wherein R may be a hydrogen, alkyl or phenyl radical. In some instances the polysiloxanes may be in a cross-linked form as the following:

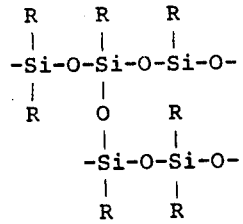

and may contain rings in either form as illustrated below with a straight chain polymer:

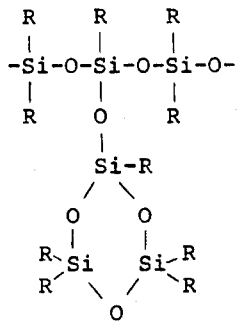

Examples of such polysiloxanes are found in literature such as in the "Chemistry of the Silicones" by Eugene Rochow, J. Wiley and Sons, Inc., second edition, 1951. These silicones are available commercially under a variety of trade names from such companies as Dow Corning Corporation, Sun Chemical Company, General Electric and the Union Carbide Corporation either as the pure chemicals or in the form of aqueous emulsions or dispersions. Dimethyl polysiloxanes having a viscosity before emulsification of between 350 cs and 350,000 cs have been found to be particularly useful in the method of this invention.

In some instances, it may be desirable to include supplementary materials in the emulsions or solutions applied to the animals. For example, small amounts of odorants such as scented oils or perfumes may be included in the emulsions. Insect repellants may be included where insects are a problem.

In general, the liquid silicone compositions of this invention are prepared and applied as aqueous dispersions or emulsions. The compositions can be applied to the hair of the animal by any of the conventional means such as by spraying, immersion in a bath, or by brushing. Prior to application of the silicone compositions of the invention, the animal should be washed or brushed to remove existing dust and oils which may interfere with the application of the silicone coating composition of the invention.

The following examples illustrate the types of silicone compositions useful in the process of the invention. Unless otherwise indicated, all parts and percentages are by weight.

EXAMPLE 1

A silicone hair polish composition is prepared by mixing one part of a dimethyl polysiloxane emulsion containing 35% of the silicone with nine parts of water. The silicone is a dimethyl polysiloxane having a viscosity, prior to emulsification, of 10,000 cs. The 35% silicone emulsion utilized in this example is available commercially from the General Electric Company under the designation SM-2040. An odorant available under the trade designation "Rodo No. 0" from The Vanderbilt Company is included in the emulsion of this example in the amount of one-fourth teaspoon per fifteen pints of the emulsion.

EXAMPLE 2

The procedure of Example 1 is repeated except that the polysiloxane utilized is a dimethyl polysiloxane having a viscosity, prior to emulsification, of 60,000 cs. This 35% emulsion is available from General Electric under the trade designation SM-2060.

The procedure of this invention for grooming hairy animals to improve the appearance of their coat may be illustrated by the following example. The horse is washed and after washing, a liquid silicone emulsion such as described in Example 1 or 2 is applied to the horse by smoothing the material over the hair by hand. Generally, one section of the horse is coated at a time, and since the emulsions described in Examples 1 and 2 have a milky color, it is possible to apply the emulsion without missing any areas of the horse. The milky color persists only for a short time but long enough to facilitate the application of the emulsion. In cold weather the horse may be curried by brushing the coat in a circular motion. This is followed by brushing with a hard brush and then a soft brush to produce a shine. The liquid silicone emulsion may then be applied to the dry clean coat in the same manner as it is applied after the horse is washed. The horse's coat then is allowed to dry to the desired superior polished finish.

The above process results in the application of a dry coating on the hair of the animal. The coating does not attract dust or dissolve in water. Accordingly, when the animal perspires, the perspiration is clear, or foam white, and does not streak the horse's body. Unlike the prior art oil treatments, if dust collects on the horse's coat, the dust can be wiped off easily and the shine remains. One application of the emulsions described in Examples 1 and 2 last for a number of days and will withstand water and liniment baths without washing off. The silicone coatings provide a superior gloss or shine to the coats of all horses including hard to shine grey, dun, and roan colored horses. The shine lasts from 5 to 10 days and the coating will repel dirt for up to 2 weeks. Therefore, it is possible to groom a horse and then later simply wipe the horse off when it is desired to exhibit the horse. It is not necessary to completely regroom the horse each time it is exhibited. This results in a substantial savings of labor required to groom a horse. It has been found that upwards of 10 to 15 hours per week in grooming time can be saved for each horse treated by the above process.

The silicone treatment of this invention retains the natural oil in the hair of the animal and does not stick to the animal's skin thereby adding to the health and well being of the horse and decreasing dermatology problems. It also has been found that the animals groomed in accordance with the procedure of this invention attract fewer flying insects such as flies, gnats, and mosquitos on those portions of the animals which have been treated even when no insect repellant is added to the silicone. It also has been observed that the tendency of the hairs of the animals to stain due to contact with manure, urine, grass and saddle leather is definitely minimized if not totally prevented by the treatment of this invention.

The examples set forth above pertain to improving the gloss or shine of the coats of horses and other live animals. This procedure may also be applied to other hairy animals as well as articles such as fur coats and other fur items. Wigs made from hair from humans may also be treated to provide the improved shiny finish.

The embodiments of the invention in which an exclusive property or privilege is claimed are defined as follows:

1. A method of grooming the coats covering the bodies of four-legged animals to provide a soil-resistant surface and improve the appearance of the coat which comprises:
    a. cleaning the hair of the coat of the animal,
    b. applying a polish consisting essentially of water and from about 1 to about 40% by weight of an alkyl polysiloxane to the coat of the animal, and
    c. allowing the coat to dry to develop the desired soil-resistant polished finish on the coat of the animal.

2. The method of claim 1 wherein the cleaning of the hair includes currying and brushing the hair.

3. The method of claim 1 wherein the cleaning of the hair includes washing the hair.

4. The method of claim 1 wherein the alkyl polysiloxane is a dimethyl polysiloxane having a viscosity before emulsification of between about 350 Cs and 350,000 Cs.

5. The method of claim 1 wherein the polish includes an insect repellant.

* * * * *